(12) United States Patent
Lin et al.

(10) Patent No.: US 12,730,302 B2
(45) Date of Patent: Sep. 8, 2026

(54) DEFOGGING LENS BARREL STRUCTURE

(71) Applicant: Calin Technology Co., Ltd., Taichung City (TW)

(72) Inventors: Hsin-Han Lin, Taichung City (TW); Sung-Chih Wu, Taichung City (TW)

(73) Assignee: CALIN TECHNOLOGY CO., LTD., Taichung City (TW)

( * ) Notice: Subject to any disclaimer, the term of this patent is extended or adjusted under 35 U.S.C. 154(b) by 324 days.

(21) Appl. No.: 18/396,049

(22) Filed: Dec. 26, 2023

(65) Prior Publication Data

US 2025/0035921 A1 Jan. 30, 2025

(30) Foreign Application Priority Data

Jul. 26, 2023 (TW) ................................ 112127991

(51) Int. Cl.
*G02B 27/00* (2006.01)

(52) U.S. Cl.
CPC ................................ *G02B 27/0006* (2013.01)

(58) Field of Classification Search
CPC . G02B 7/00; G02B 7/008; G02B 7/02; G02B 7/026; G02B 7/028; G02B 7/18; G02B 1/10; G02B 27/00; G02B 27/0006; G03B 17/02; G03B 17/55; G03B 17/56; G03B 17/00; H04N 5/225; H04N 5/2252; H04N 5/22521; H04N 5/2254
USPC ......... 359/820, 511–513, 507, 694; 219/219, 219/50, 600
See application file for complete search history.

(56) References Cited

U.S. PATENT DOCUMENTS

2005/0152050 A1* 7/2005 Noda ....................... G11B 7/22 359/819
2023/0244128 A1* 8/2023 Van Den Brink ....... H05B 3/84 359/820

FOREIGN PATENT DOCUMENTS

CN 115236922 A 10/2022
TW I790888 B 1/2023

* cited by examiner

*Primary Examiner* — Jie Lei
(74) *Attorney, Agent, or Firm* — Birch, Stewart, Kolasch & Birch, LLP

(57) ABSTRACT

A defogging lens barrel structure includes a lens barrel, a heating module, and a lens assembly. The lens barrel includes a receiving groove with an inner wall. The heating module and the lens assembly are respectively disposed within the lens barrel. The lens assembly includes a first lens mounted in the receiving groove, supported by the heating module, and having a peripheral portion. A slot is provided between the peripheral portion and the inner wall. The receiving groove has a positioning part. The heating module has a positioned part correspondingly matching with the positioning part. A gap is provided between the heating module and the inner wall. With such design, the contact of the heating module and the first lens with the inner wall of the lens barrel could be reduced, thereby reducing the effect of the heat of the heating module and the first lens being dispersed.

17 Claims, 14 Drawing Sheets

DEFOGGING LENS BARREL STRUCTURE

BACKGROUND OF THE INVENTION

Technical Field

The present invention generally relates to a lens barrel structure, and more particularly to a defogging lens barrel structure.

Description of Related Art

Generally, when a conventional lens is used in an external environment, a chamber inside the lens has moisture. When an ambient temperature (i.e., a temperature outside the lens) is decreased, moisture outside the lens is easily saturated to condense and form water droplets, so that fog is generated in the lens, thereby affecting a transmittance of the lens.

In order to resolve the fogging problem of the conventional lens, there are few defogging lenses available. For example, a defogging lens include a lens barrel, at least one lens, and a heating member, wherein the at least one lens is disposed in the lens barrel; the heating member includes a heating lens and a power line, wherein the heating lens is disposed on the at least one lens, and the power line passes through the lens barrel to be connected to the heating lens, so that the heating lens could generate a thermal energy to prevent the formation of fog or water droplets.

However, the aforementioned defogging lens has drawbacks. For example, the heating lens directly abuts against an inner wall of the lens barrel; when the heating lens performs heating, the thermal energy of the heating lens is partially dispersed to the lens barrel due to the heating lens being in contact with the lens barrel, so that the entire heating lens cannot be evenly heated; as a result, the fogging problem will still be resulted when the heating lens is used under extremely cold environment.

Therefore, how to provide a lens which could resolve the fogging problem of the lens, is a problem needed to be solved in the industry.

BRIEF SUMMARY OF THE INVENTION

In view of the reasons mentioned above, the primary objective of the present invention is to provide a defogging lens barrel structure, which could effectively reduce the contact of the lens and the heating plate with the inner wall of the lens barrel, thereby decreasing the dispersion of thermal energy from the lens assembly and the heating plate to the lens barrel and hence resolving the issue of fogging of the lens assembly of a lens.

The present invention provides a defogging lens barrel structure including a lens barrel, a heating module, and a lens assembly. The lens barrel comprises a receiving groove, wherein an inner portion of the receiving groove has an inner wall. The heating module is disposed inside the receiving groove of the lens barrel and adapted to provide a heat source. The lens assembly is disposed inside the lens barrel and comprises a first lens, wherein the first lens is installed in the receiving groove and supported on the heating module; the first lens has a peripheral portion, wherein at least one slot is provided between the peripheral portion and the inner wall.

In an embodiment, the defogging lens barrel structure further comprises a heat-insulating and positioning module installed in the receiving groove of the lens barrel, wherein heat-insulating and positioning module surrounds the peripheral portion of the first lens and is fixed within the at least one slot; a thermal conductivity of the heat-insulating and positioning module is less than 0.1 W/m·K.

In an embodiment, the peripheral portion has an annular peripheral surface facing the inner wall of the receiving groove; the heat-insulating and positioning module includes an outer annular fixing seat, wherein the outer annular fixing seat is correspondingly disposed within the at least one slot and contacts the annular peripheral surface and the inner wall, thereby the outer annular fixing seat is positioned between the lens barrel and the first lens.

In an embodiment, the first lens has an optical ineffective region and an optical effective region, the optical ineffective region surrounds the optical effective region, and the optical ineffective region comprises the peripheral portion and the annular peripheral surface. The heat-insulating and positioning module includes an inner annular fixing seat, wherein the outer annular fixing seat is engaged with an outer periphery of the inner annular fixing seat; the outer annular fixing seat surrounds the peripheral portion of the optical ineffective region, and the inner annular fixing seat abuts against the optical ineffective region and surrounds the optical effective region.

In an embodiment, the receiving groove has a side opening radially penetrating the inner wall of the receiving groove; the heat-insulating and positioning module has a limiting block radially protruding outward from the outer annular fixing seat; two card slots are respectively provided on two side edges of the limiting block; when the heat-insulating and positioning module is installed in the receiving groove of the lens barrel, the limiting block extends out of the side opening and the two card slots are correspondingly engaged with a peripheral edge of the side opening.

In an embodiment, the lens barrel comprises at least one fixing portion disposed on the inner wall of the receiving groove to tightly abut against the annular peripheral surface of the first lens; the outer annular fixing seat of the heat-insulating and positioning module has at least one notch correspondingly matching with the at least one fixing portion.

In an embodiment, the at least one fixing portion of the lens barrel comprises a plurality of fixing portions; the plurality of fixing portions are spaced along the inner wall of the receiving groove; each of the plurality of fixing portions tightly abuts against the annular peripheral surface of the first lens; the at least one slot comprises a plurality of slots; the plurality of slots provided between a portion of the annular peripheral surface of the first lens and the inner wall are respectively formed between two of the plurality of fixing portions that are adjacent.

In an embodiment, the outer annular fixing seat has a plurality of retaining blocks; the at least one notch of the outer annular fixing seat comprises a plurality of notches; the plurality of retaining blocks are correspondingly engaged and fixed within the plurality of slots, wherein an end portion of each of the plurality of retaining blocks abuts against side of the two adjacent fixing portions; each of the plurality of notches is located between two of the plurality of retaining blocks that are adjacent and correspondingly matches with one of the plurality of fixing portions.

In an embodiment, the heating module comprises an electric heating element and a power connection part; the electric heating element is supported on a bottom of the receiving groove; the first lens is disposed on the electric heating element; the power connection part is connected to the electric heating element and extends out of the lens barrel through the side opening to be connected to an external power source.

In an embodiment, the lens barrel comprises a cutting groove and a guiding groove; the cutting groove is cut flat on the bottom of the receiving groove along an axis of the side opening; the guiding groove is disposed on an outer peripheral surface of the lens barrel along the axis of the side opening and opens to communicate with the cutting groove; when the heating module and the heat-insulating and positioning module are installed in the receiving groove, the power connection part of the heating module is guided out of the side opening and extends towards the cutting groove and the guiding groove; a part of the power connection part is correspondingly accommodated within the guiding groove; the limiting block of the heat-insulating and positioning module extends out of the side opening to be engaged with the cutting groove.

The present invention further provides a defogging lens barrel structure including a lens barrel, a heating module, and a lens assembly. The lens barrel comprises a receiving groove, wherein an inner portion of the receiving groove has an inner wall and at least one positioning part. The heating module is disposed inside the receiving groove of the lens barrel and adapted to provide a heat source; the heating module has at least one positioned part corresponding to the at least one positioning part of the lens barrel, and at least one gap is provided between the heating module and the inner wall. The lens assembly is disposed inside the lens barrel and comprises a first lens, wherein the first lens is installed in the receiving groove and supported on the heating module.

In an embodiment, the at least one positioning part comprises a protrusion disposed on a bottom of the receiving groove; the heating module has an electric heating element supported on the bottom of the receiving groove; the at least one positioned part includes a hole corresponding to the protrusion and disposed on the electric heating element; the at least one gap is formed between the electric heating element and the inner wall of the receiving groove.

In an embodiment, the first lens has a peripheral portion; the peripheral portion has an annular peripheral surface facing the inner wall of the receiving groove; the lens barrel comprises at least one fixing portion disposed on the inner wall of the receiving groove to tightly abut against the first lens; the protrusion of the at least one positioning part extends radially outward from the at least one fixing portion; at least one slot is provided between the peripheral portion and the inner wall and correspondingly communicates with the at least one gap.

In an embodiment, the at least one fixing portion of the lens barrel comprises a plurality of fixing portions; the plurality of fixing portions are spaced along the inner wall of the receiving groove; each of the plurality of fixing portions tightly abuts against the annular peripheral surface of the first lens; the at least one slot comprises a plurality of slots; the plurality of slots provided between a portion of the annular peripheral surface of the first lens and the inner wall are respectively formed between two of the plurality of fixing portions that are adjacent; the at least one positioning part of the receiving groove comprises a plurality of positioning parts; the protrusions of the plurality of positioning parts are respectively engaged with one of the plurality of fixing portions; the at least one positioned part of the heating module comprises a plurality of positioned parts; the holes of the plurality of positioned portions are correspondingly spaced along a peripheral edge of the electric heating element; the at least one gap comprises a plurality of gaps; the plurality of gaps provided between the electric heating element and the inner wall are respectively formed between two of the plurality of fixing portions that are adjacent, thereby each of the plurality of gaps correspondingly communicates with one of the plurality of slots.

In an embodiment, the receiving groove has a side opening radially penetrating the inner wall of the receiving groove; the heating module comprises a power connection part, wherein the power connection part is connected to the electric heating element and is guided out of the side opening of the lens barrel to be connected to an external power source.

In an embodiment, the lens barrel has a cutting groove and a guiding groove; the cutting groove is cut flat along an axis of the side opening at the bottom of the receiving groove; the guiding groove is disposed on an outer peripheral surface of the lens barrel along the axis of the side opening and opens to communicate with the cutting groove; when the heating module is installed in the receiving groove, the power connection part of the heating module is guided out of the side opening and extends in a direction toward the cutting groove and the guiding groove and a part of the power connection part is correspondingly accommodated within the guiding groove.

In an embodiment, the defogging lens barrel structure further comprises a heat-insulating and positioning module disposed in the receiving groove of the lens barrel, wherein the heat-insulating and positioning module includes an outer annular fixing seat; which is correspondingly disposed within the at least one slot and contacts the annular peripheral surface and the inner wall; the outer annular fixing seat extends into the at least one gap between the electric heating element and the inner wall, thereby the outer annular fixing seat is positioned between the lens barrel and the first lens; the outer annular fixing seat has at least one notch correspondingly matching with the at least one fixing portion.

In an embodiment, the defogging lens barrel structure further comprises a heat-insulating and positioning module disposed in the receiving groove of the lens barrel, wherein the heat-insulating and positioning module includes an outer annular fixing seat with a plurality of retaining blocks and a plurality of notches; the plurality of retaining blocks are correspondingly engaged with the plurality of slots and extend into the plurality of gaps; an end portion of each of the plurality of retaining blocks abuts side edges of the two adjacent fixing portion; the plurality of notches are respectively disposed between two of the plurality of retaining blocks that are adjacent correspondingly match with the plurality of fixing portions.

In an embodiment, the first lens has an optical ineffective region and an optical effective region; the optical ineffective region surrounds the optical effective region; the optical ineffective region includes the peripheral portion and the annular peripheral surface; the heat-insulating and positioning module comprises an inner annular fixing seat; the outer annular fixing seat is engaged with an outer periphery of the inner annular fixing seat; the outer annular fixing seat surrounds the peripheral portion of the optical ineffective region, and the inner annular fixing seat abuts the optical ineffective region and surrounds the optical effective region; a thermal conductivity of the heat-insulating and positioning module is less than 0.1 W/m·K.

With the aforementioned design of the defogging lens barrel structure, when the first lens is installed in the receiving groove of the lens barrel, a slot is formed between the peripheral portion of the first lens and the inner wall of the lens barrel, thereby preventing the annular peripheral surface of the peripheral portion from contacting the inner wall of the lens barrel. Additionally, the electric heating element of the heating module could be quickly positioned in the receiving groove of the lens barrel by the positioned part of the heating module correspondingly matching with the positioning part of the lens barrel, and a gap is formed between the electric heating element and the inner wall of the receiving groove. In this way, when the heating module is activated for heating, the contact area between the electric heating element and the inner wall and the contact arear between the first lens and the inner wall are reduced, thereby lowering the thermal energy dispersion efficiency of the heating module to the lens barrel. Thus, the heating efficiency of the heating module on the first lens could be concentrated, ensuring uniform heating of the entire first lens and hence achieving the purpose of removing fogging on the first lens.

Additionally, the design of the heat-insulating and positioning module in this embodiment involves correspondingly inserting the outer annular fixing seat into the slot and extending the outer annular fixing seat to block the gap, so that the contact between the first lens and the inner wall of the lens barrel, as well as the contact between the peripheral edge of the electric heating element and the inner wall, are effectively prevented. The heat-insulating and positioning module surrounds the electric heating element and the first lens, so that the heat transfer between the heating module and the lens barrel due to thermal convection and radiation could be further reduced and the concentration of the heating efficiency of the heating module on the first lens could be enhanced, thereby hindering fogging on the first lens and hence improving the clarity of the image captured by the lens assembly.

BRIEF DESCRIPTION OF THE SEVERAL VIEWS OF THE DRAWINGS

The present invention will be best understood by referring to the following detailed description of some illustrative embodiments in conjunction with the accompanying drawings, in which

FIG. 14 is a schematic sectional view along the sectional line 14-14 in FIG. 12.

DETAILED DESCRIPTION OF THE INVENTION

Figure 1:
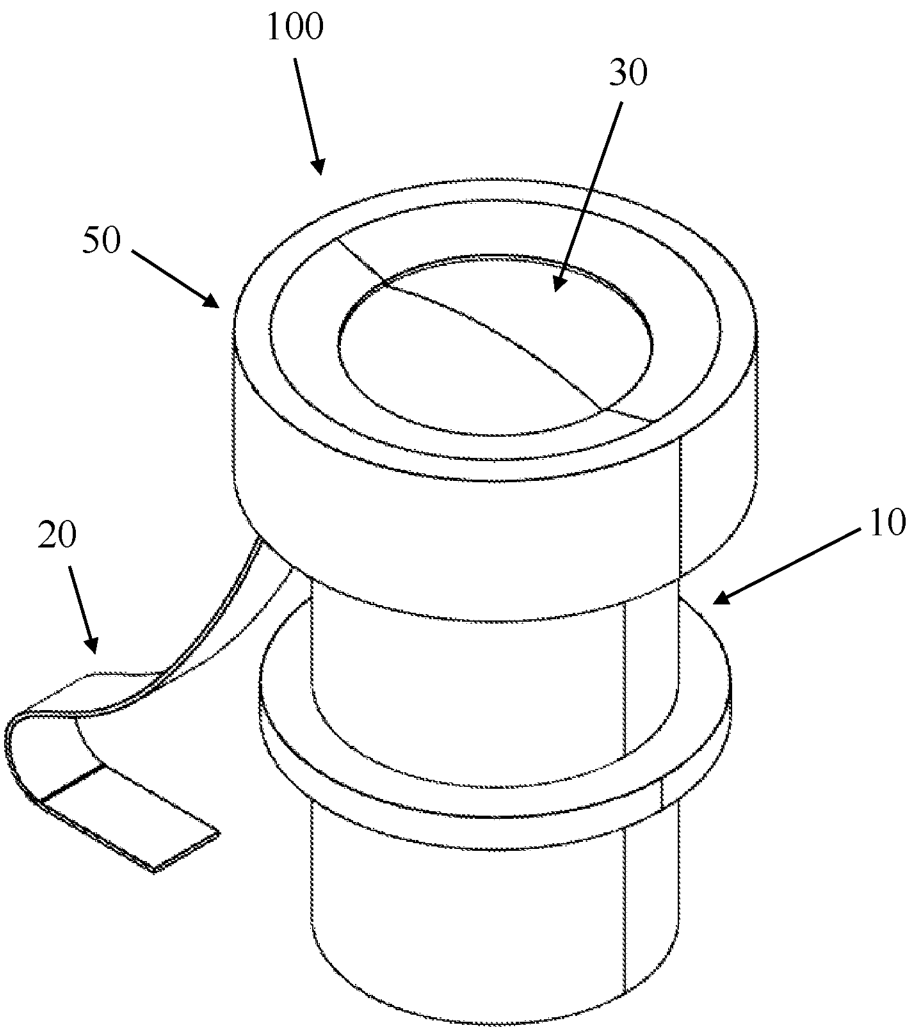
FIG. 1 is a perspective view of the defogging lens barrel structure according to an embodiment of the present invention.
Figure 2:
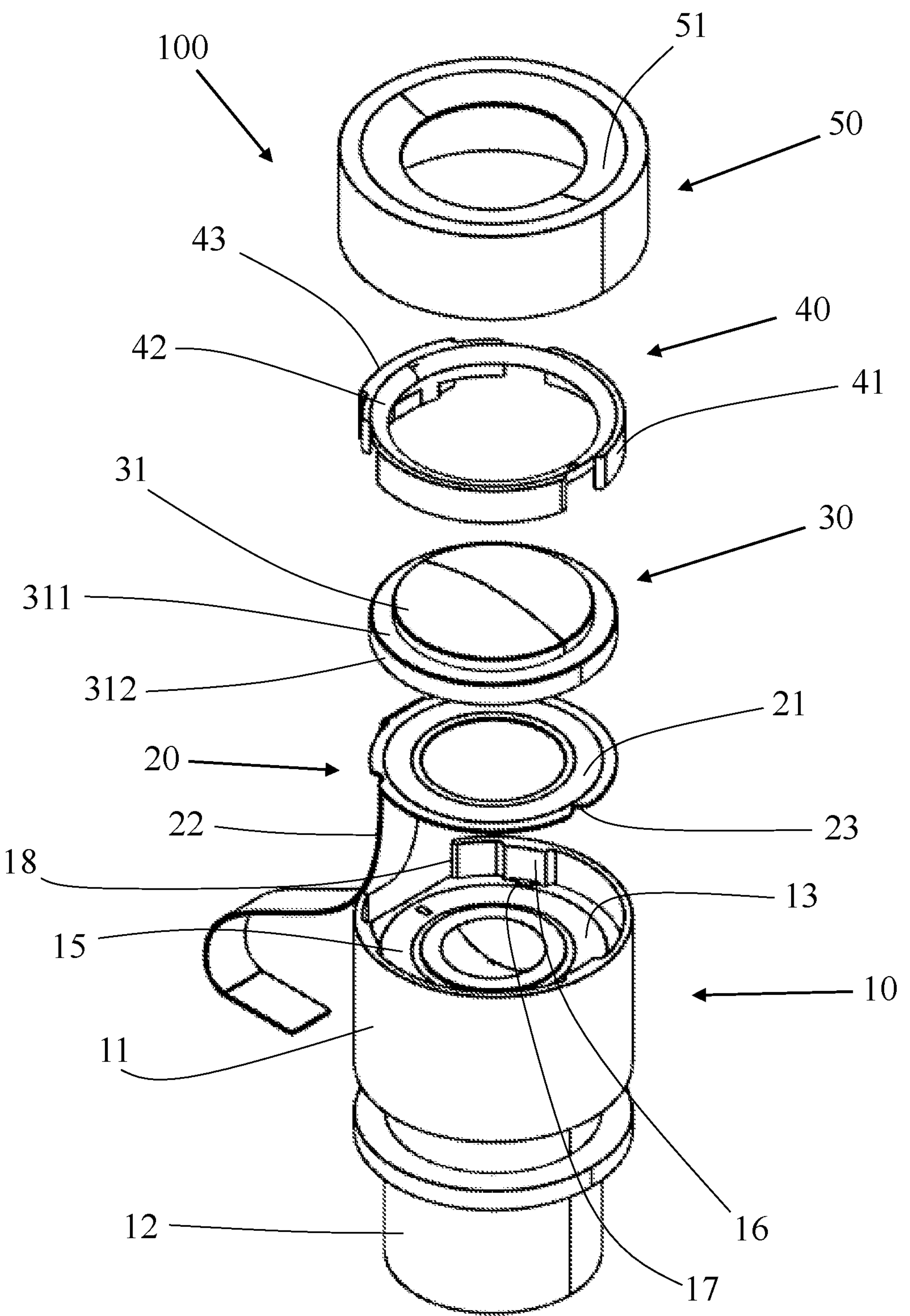
FIG. 2 is an exploded view of the defogging lens barrel structure according to the embodiment of the present invention.
Figure 3:
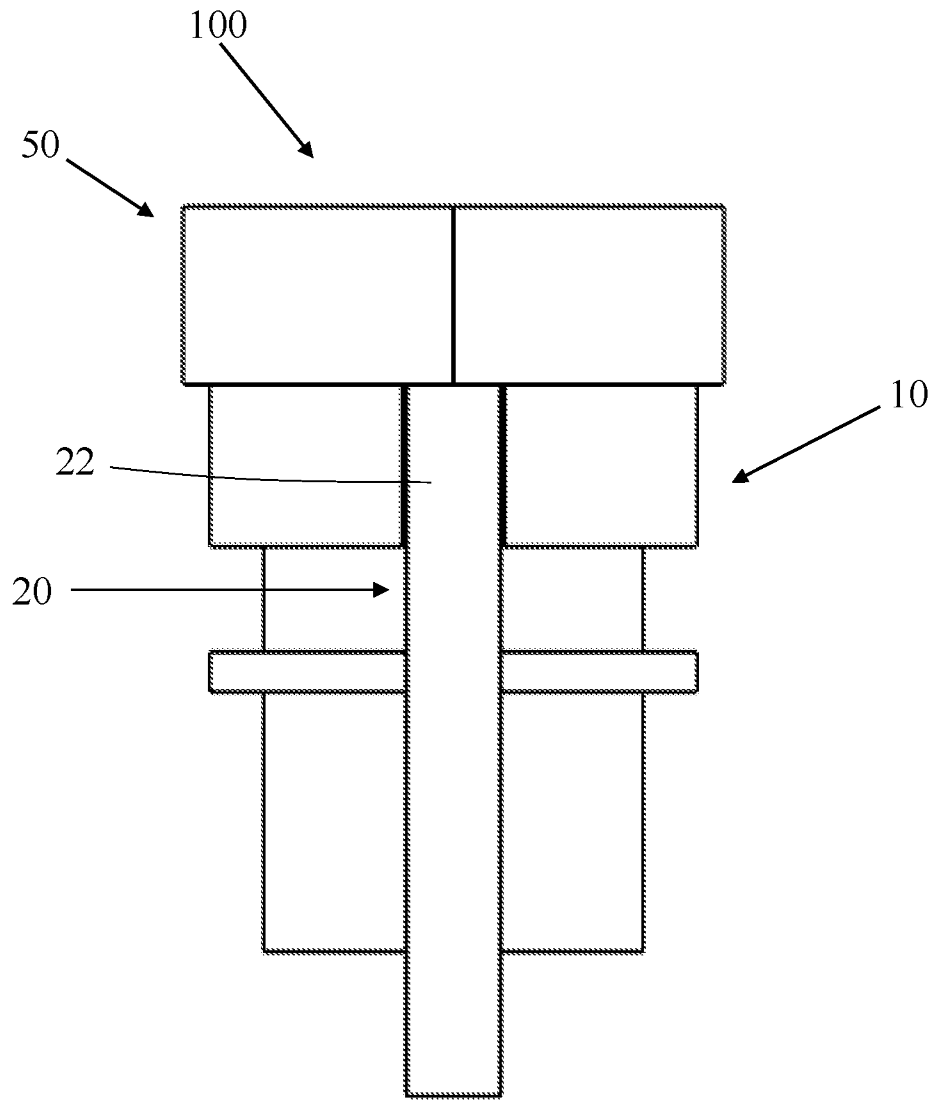
FIG. 3 is a side view of the defogging lens barrel structure according to the embodiment of the present invention.

A defogging lens barrel structure 100 according to an embodiment of the present invention is illustrated in FIG. 1 to FIG. 3 and basically includes a lens barrel 10, a heating module 20, a lens assembly 30, a heat-insulating and positioning module 40, and a lens cover 50.

Figure 4:
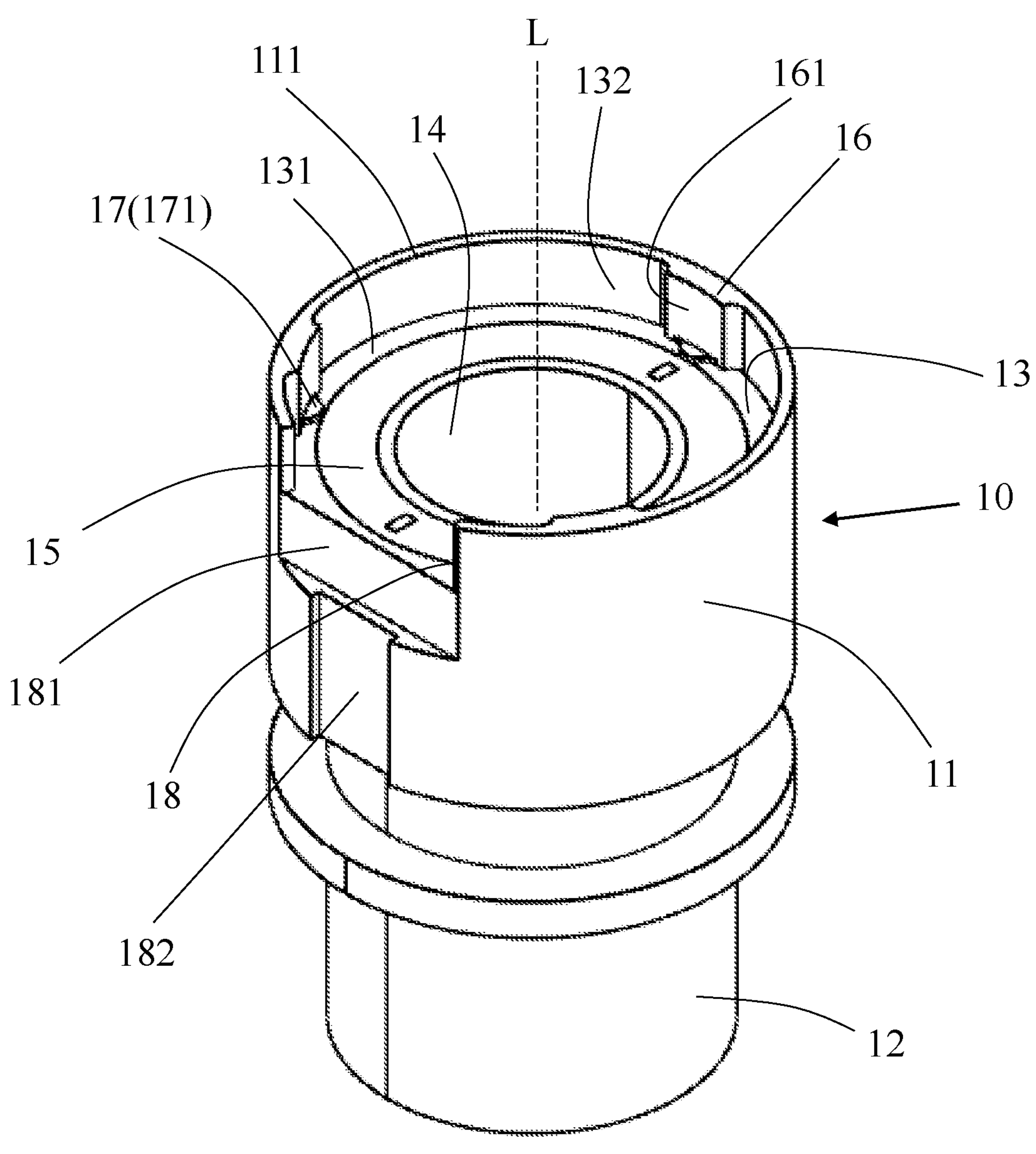
FIG. 4 is a perspective view of the lens barrel of the defogging lens barrel structure according to the embodiment of the present invention.
Figure 5:
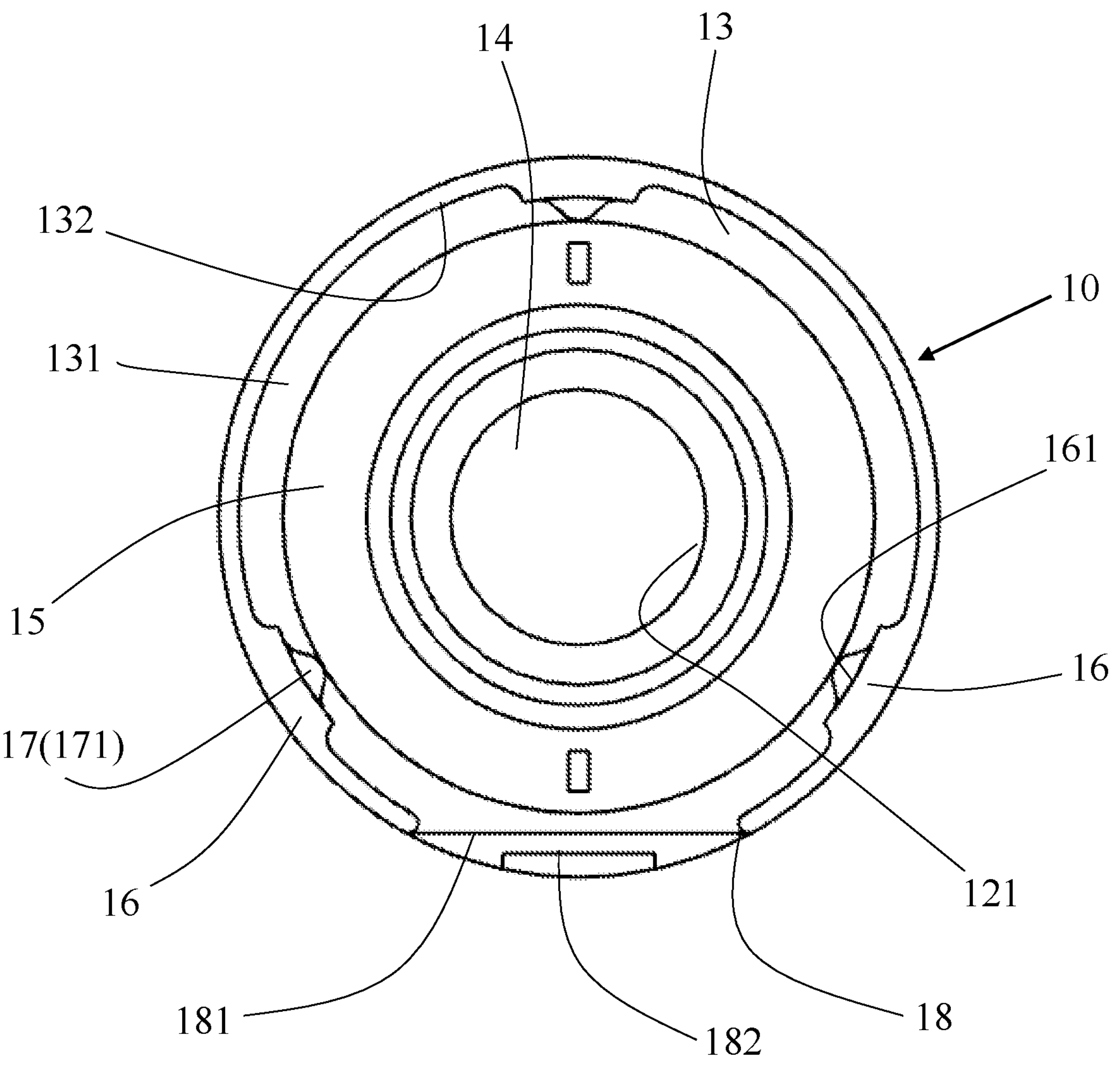
FIG. 5 is a top view of the lens barrel of the defogging lens barrel structure according to the embodiment of the present invention.
Figure 6:
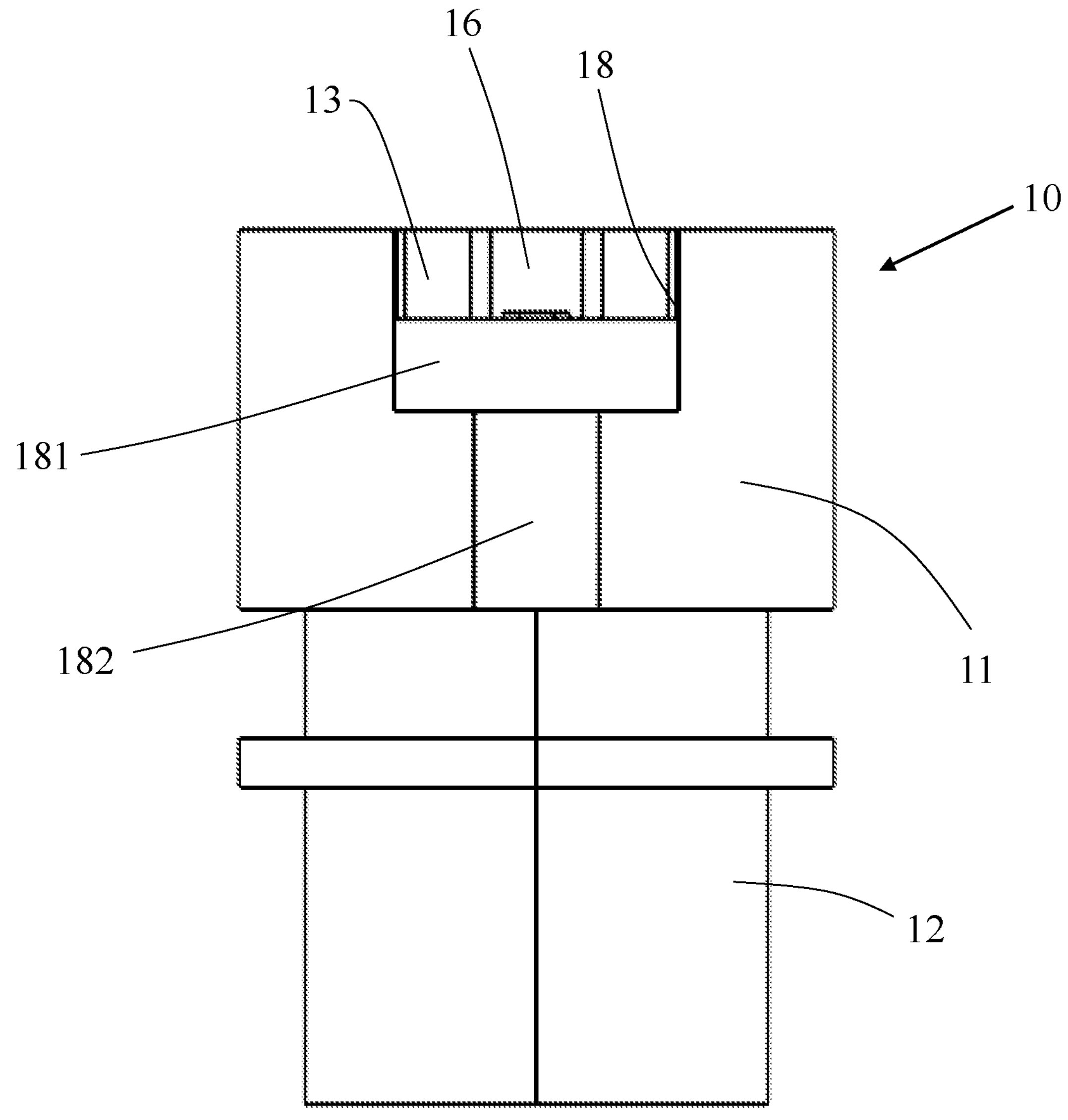
FIG. 6 is a side view of the lens barrel of the defogging lens barrel structure according to the embodiment of the present invention.

The lens barrel 10 is overall a hollow cylindrical shape. As shown in FIG. 4 to FIG. 6, the lens barrel 10 defines a central axis L. The lens barrel 10 includes a head portion 11 and a body portion 12, which are integrally formed along the central axis L. One end of the head portion 11 has an object-side opening 111, and an end of the body portion 12 opposite to the head portion 11 has an image-side opening 121. As shown in FIG. 4 and FIG. 5, in this embodiment, the interior of the lens barrel 10 along the central axis L includes a receiving groove 13 and a through groove 14. The receiving groove 13 is disposed inside the head portion 11 and communicates with the object-side opening 111, while the through groove 14 penetrates the interior of both the head portion 11 and the body portion 12 and communicates with the receiving groove 13 and the image-side opening 121. Specifically, the interior of the receiving groove 13 includes an abutment surface 131, an inner wall 132, and an annular groove 133. The abutment surface 131 faces the object-side opening 111 and is located at a bottom of the receiving groove 13. The inner wall 132 is connected between the abutment surface 131 and the object-side opening 111. The annular groove 133 is arranged around the central axis L on the abutment surface 131 (shown in FIG. 10). The annular groove 133 is filled with a heat-insulating layer 15. The heat-insulating layer 15 could be a solid material (asbestos, glass fiber) or a gel layer, and a thermal conductivity of the heat-insulating layer 15 is less than 0.1 W/m·K. In other embodiments, the heat-insulating layer 15 might be made of other heat-insulating materials according to requirements; the annular groove 133 and the heat-insulating layer 15 might be omitted, and the receiving groove 13 might only include the abutment surface 131 and the inner wall 132.

In addition, as shown in FIG. 4 and FIG. 5, the lens barrel 10 includes a plurality of fixing portions 16 and a plurality of positioning parts 17. The fixing portions 16 are disposed in the receiving groove 13 and are engaged with the inner wall 132. The fixing portion 16 are arranged on the inner wall 132 of the receiving groove 13 at regular intervals and radially protrude outwards from the inner wall 132 of the receiving groove 13 to be vertically connected between the abutment surface 131 and the object-side opening 111, and are adapted to position lenses of the lens assembly 30. The positioning parts 17 are disposed in the receiving groove 13 and respectively include a protrusion 171. The protrusion s 171 radially extend inwards from an inner surface 161 of the fixing portion 16 and is adapted to position the heating module 20.

In other embodiments, the number and shape of the fixing portions 16 and the positioning parts 17 in the lens barrel 10 could be adjusted according to requirements. For example, the number of the fixing portions 16 and the positioning parts 17 could be at least one. The positioning parts 17 are not limited to being engaged with the fixing portion 16, wherein the positioning parts 17 could be engaged with the inner wall 132 of the receiving groove 13 or disposed on the abutment surface 131 at the bottom of the receiving groove 13 (i.e., the positioning parts 17 are disposed in the receiving groove 13), eliminating the need for the fixing portions 16. Besides, the positioning parts 17 could be omitted, as long as the lenses of the lens assembly 30 and the heating module 20 could be positioned in the receiving groove 13 of the lens barrel 10.

Furthermore, as shown in FIG. 4 to FIG. 6, the lens barrel 10 further includes a side opening 18, a cutting groove 181, and a guiding groove 182. The side opening 18 penetrates the inner wall 132 of the receiving groove 13 and is connected to the object-side opening 111. The cutting groove 181 is cut flat on the abutment surface 131 of the receiving groove 13 along an axis of the side opening 18. The guiding groove 182 is disposed on an outer peripheral surface of the lens barrel 10 along the axis of the side opening 18, and the guiding groove 182 opens to communicate with the cutting groove 181 (shown in FIG. 6). In other embodiments, the structure of the side opening 18, the cutting groove 181, and the guiding groove 182 in the lens barrel 10 could be adjusted in position according to requirements, or the side opening 18, the cutting groove 181, and the guiding groove 182 could be omitted, as long as the lens barrel 10 includes the receiving groove 13.

The heating module 20 is installed in the receiving groove 13 of the lens barrel 10 and is adapted to provide a heat source. As shown in FIG. 2, FIG. 3, FIG. 7, and FIG. 8, in this embodiment, the heating module 20 includes an electric heating element 21 and a power connection part 22. The electric heating element 21 surrounds the central axis L and is correspondingly supported on the abutment surface 131 of the receiving groove 13. The electric heating element 21 covers the heat-insulating layer 15. The power connection part 22 is connected to the electric heating element 21 and is guided out of the lens barrel 10 through the side opening 18 to be connected to an external power source. The power connection part 22 is guided out of the side opening 18 and extends in a direction towards the cutting groove 181 and the guiding groove 182, so that the electric heating element 21 could be activated for heating.

Figure 7:
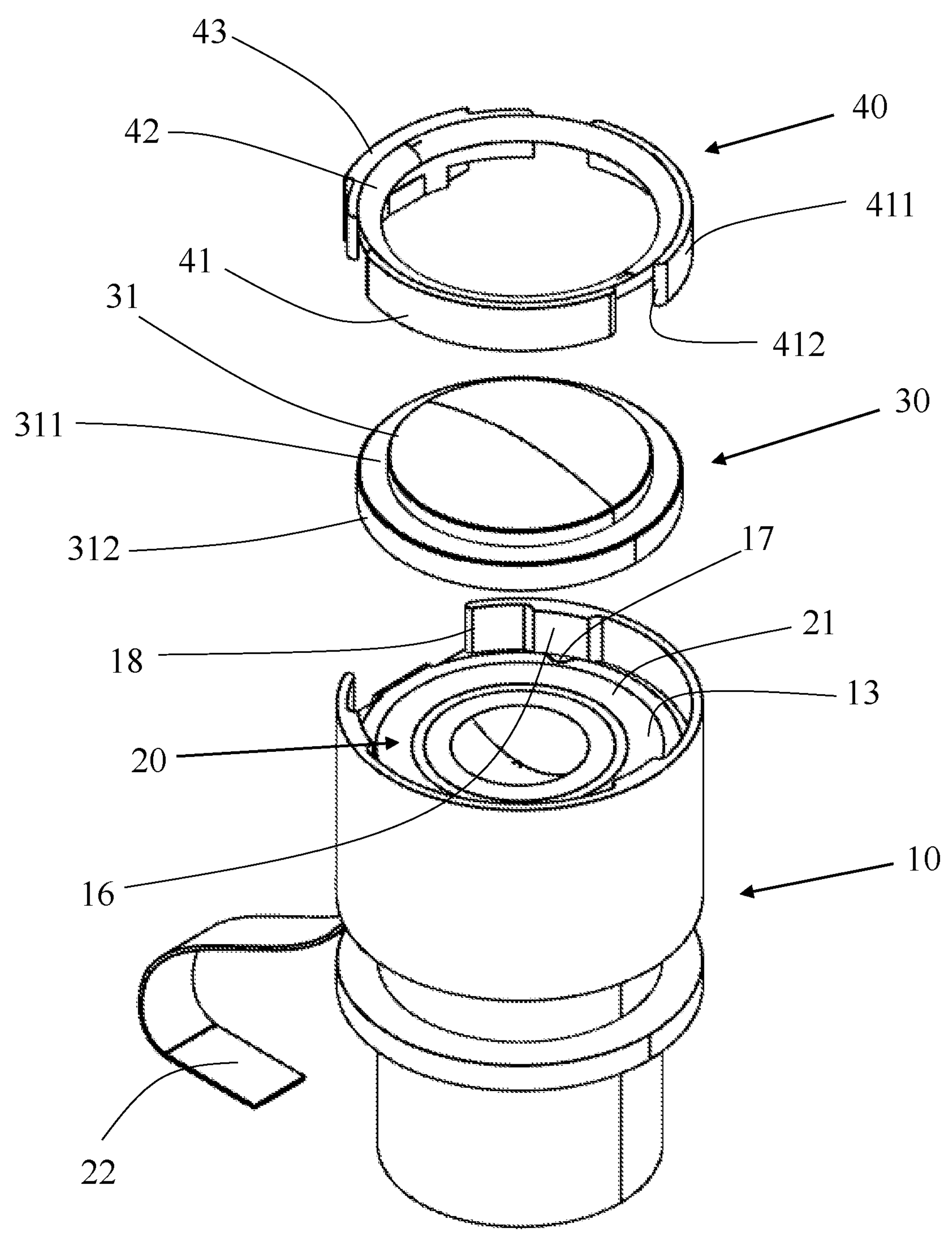
FIG. 7 is a schematic view of the defogging lens barrel structure according to the embodiment of the present invention, showing that the first lens and the heat-insulating and positioning module are separated from the lens barrel.
Figure 8:
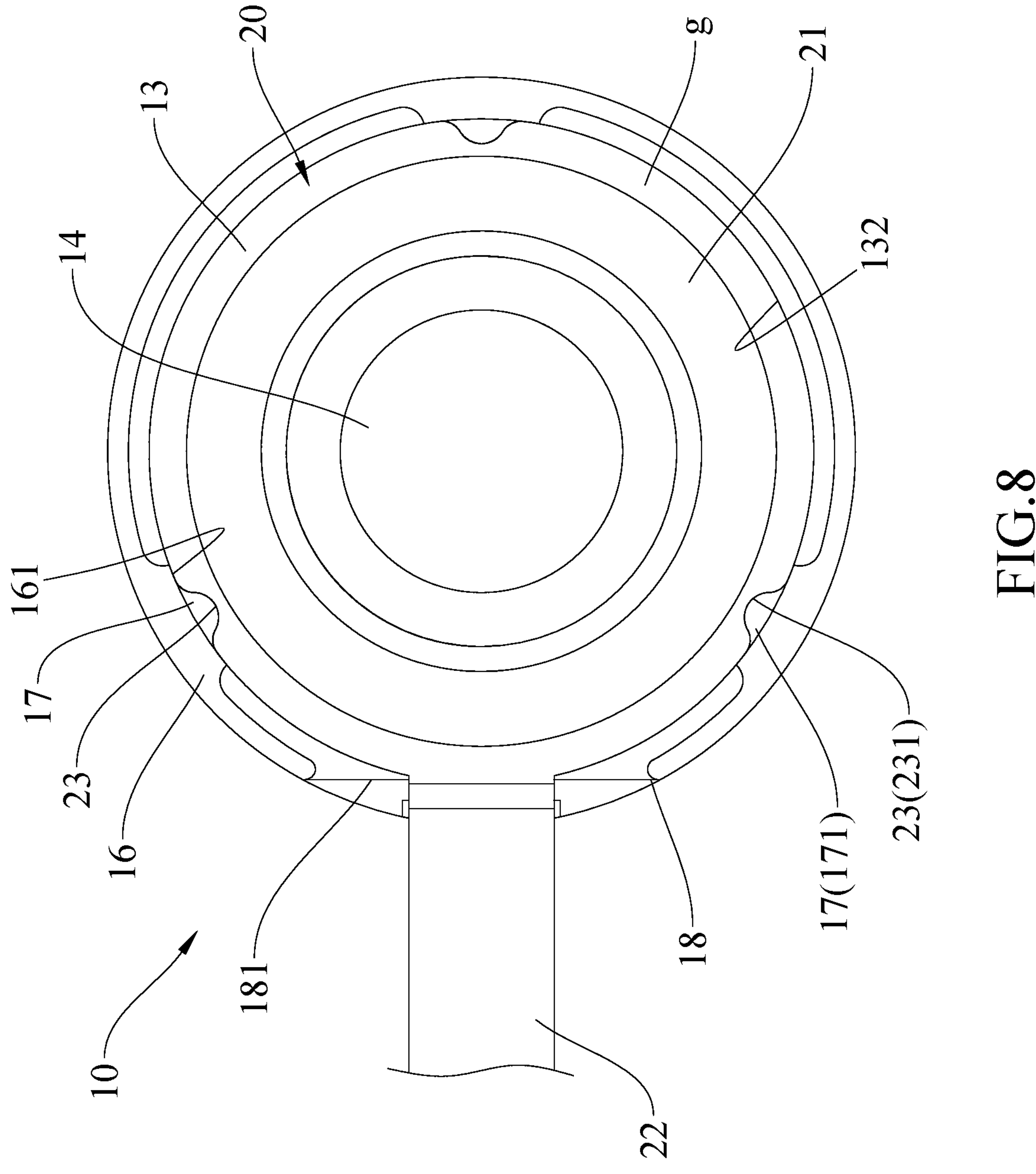
FIG. 8 is a top view, showing that the heating module is installed inside the lens barrel of the defogging lens barrel structure according to the embodiment of the present invention.

In particular, as shown in FIG. 7 and FIG. 8, the heating module 20 has a plurality of positioned parts 23, which are disposed at intervals around a peripheral edge of the electric heating element 21. The positioned parts 23 correspondingly match the positioning parts 17 in the receiving groove 13 of the lens barrel 10. In this embodiment, each of the positioned parts 23 includes a hole 231 that is recessed into the peripheral edge of the electric heating element 21. In this way, when the heating module 20 is installed in the receiving groove 13 of the lens barrel 10, the positioned parts 23 of the electric heating element 21 and the positioning parts 17 of the lens barrel 10 are mutually engaged, so that the electric heating element 21 could be quickly positioned in the receiving groove 13 of the lens barrel 10. At least one gap g is provided between the peripheral edge of the electric heating element 21 and the inner wall 132 of the receiving groove 13 and is adapted to reduce the contact area between the peripheral edge of the electric heating element 21 and the inner wall 132 of the lens barrel 10. The width of the gap g corresponds to the distance between the electric heating element 21 and the inner wall 132, and the power connection part 22 is guided out of the side opening 18 and extends in the direction towards the cutting groove 181 and the guiding groove 182 (shown in FIG. 3, FIG. 4, and FIG. 7). This arrangement ensures that the thermal energy generated by the electric heating element 21 is not directly conducted to the inner wall 132 of the lens barrel 10, thereby reducing the effect of dispersing the thermal energy of the heating module 20.

In other embodiments, the structure of the heating module 20 could be adjusted according to requirements. For example, the number of the positioned parts 23 of the heating module 20 corresponds to the number of the positioning parts 17 of the lens barrel 10. When the number of the positioning parts 17 of the lens barrel 10 is at least one, the number of the positioned parts 23 of the heating module 20 could be adjusted to at least one. The positioned parts 23 of the heating module 20 could be omitted, as long as the electric heating element 21 of the heating module 20 could be fixed in the receiving groove 13 by other positioning means. The positioned parts 23 of the heating module 20 are not limited to include the holes 231, as long as the positioned parts 23 of the heating module 20 and the positioning parts 17 of the lens barrel 10 match with each other in convex-concave structure; for example, the positioned parts 23 could be replaced with protrusions and the positioning parts 17 could be replaced with holes. The positioned parts 23 of the heating module 20 could be adjusted in position to correspond to the positioning parts 17 of the lens barrel 10; for example, when the positioning parts 17 of the lens barrel 10 are disposed on the abutment surface 131 at the bottom of the receiving groove 13, the holes 231 of the positioned parts 23 of the heating module 20 are disposed on the electric heating element 21 to correspond to the protrusions 171 of the positioning parts 17.

Figure 9:
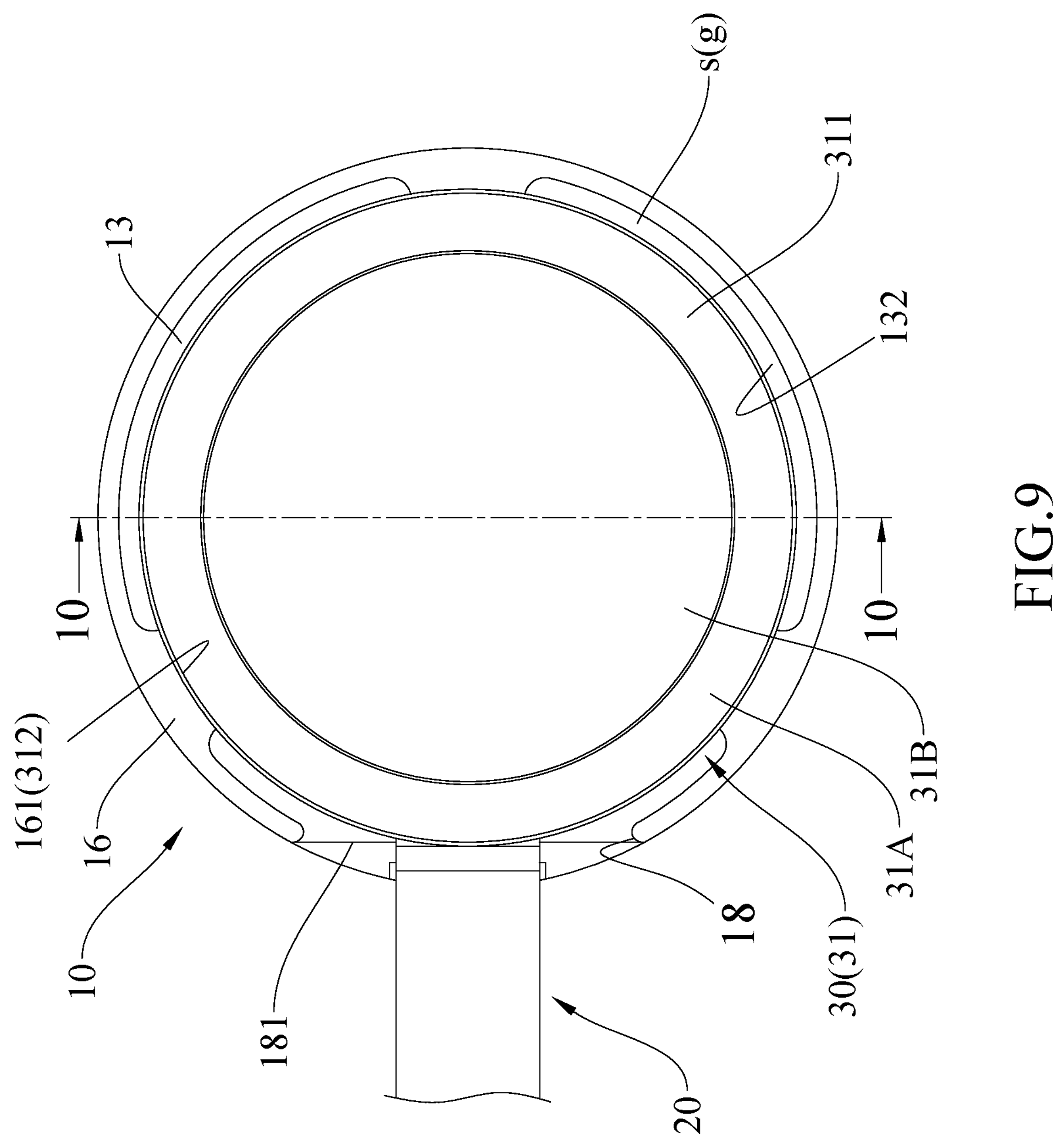
FIG. 9 is a top view, showing that the first lens is installed inside the lens barrel of the defogging lens barrel structure according to the embodiment of the present invention.
Figure 10:
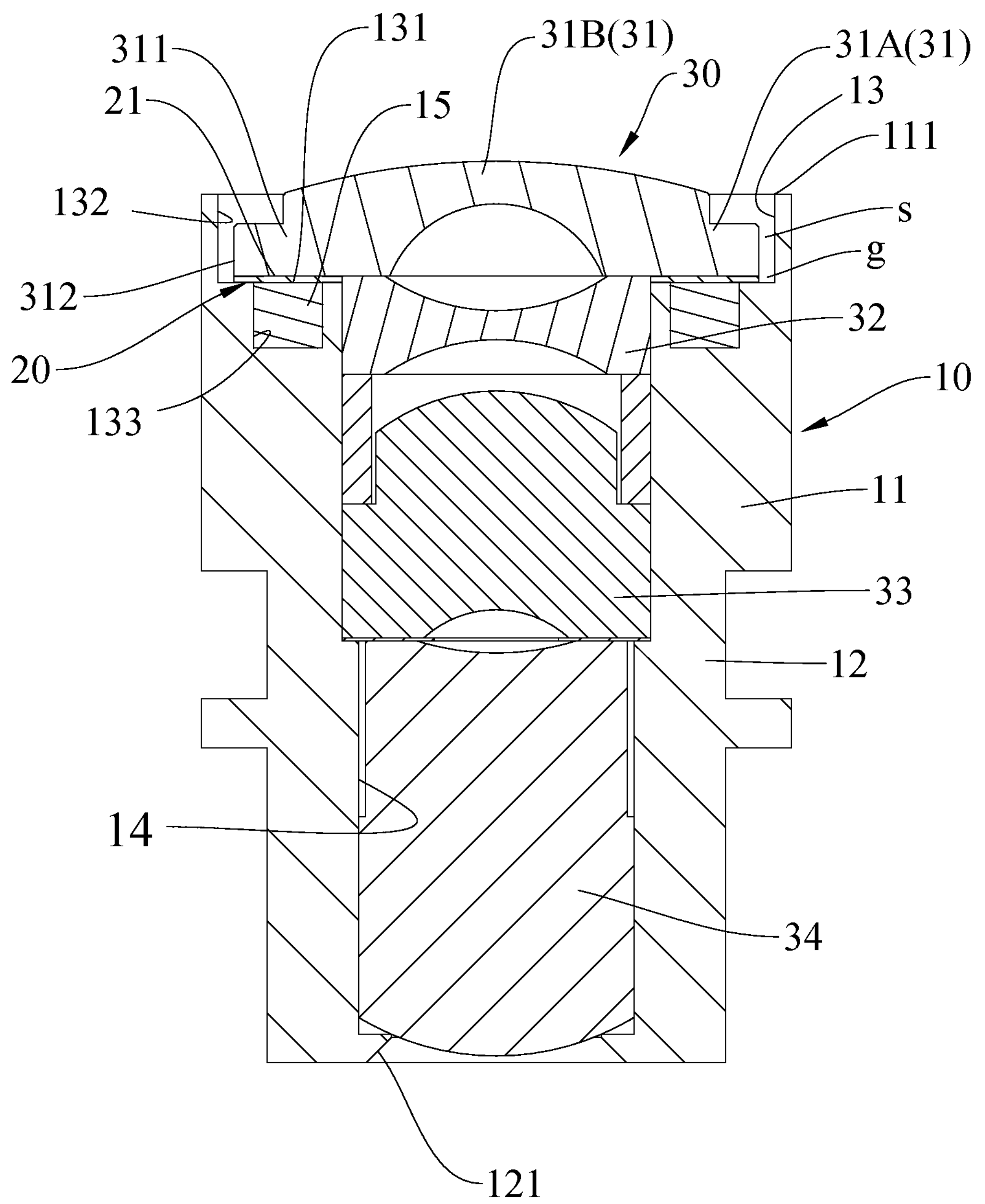
FIG. 10 is a schematic sectional view along the sectional line 10-10 in FIG. 9.
Figure 11:
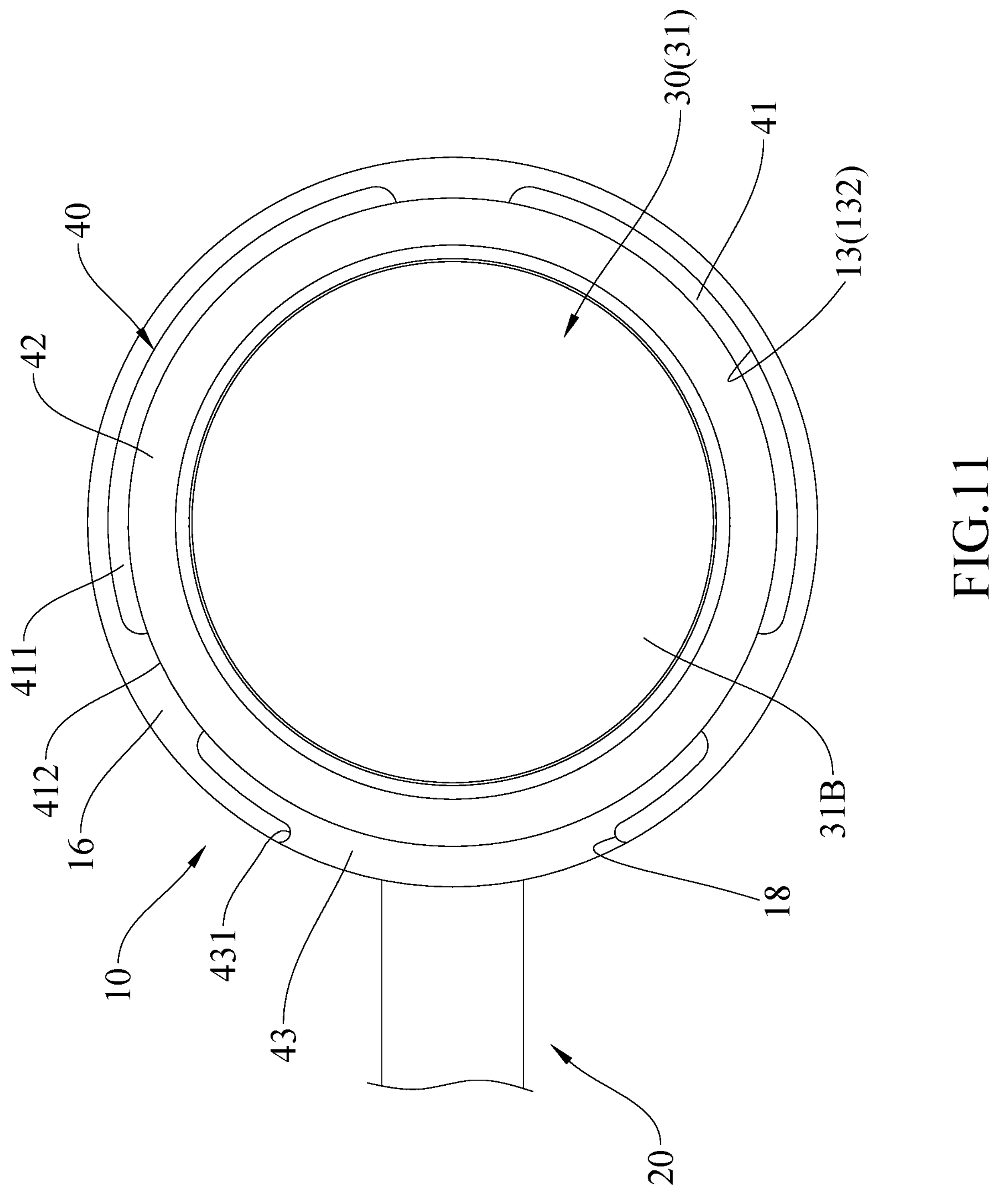
FIG. 11 is a top view, showing that the heat-insulating and positioning module is installed inside the lens barrel of the defogging lens barrel structure according to the preferred embodiment of the present invention.

The lens assembly 30 is disposed inside the lens barrel 10 and includes a first lens 31. The first lens 31 is installed in the receiving groove 13 and supported on the electric heating element 21 of the heating module 20. The first lens 31 has a peripheral portion 311, wherein at least one slot s is provided between the peripheral portion 311 and the inner wall 132. The width of the at least one slot s is the distance between the peripheral portion 311 and the inner wall 132. As shown in FIG. 7 to FIG. 10, the first lens 31 has an optical ineffective region 31A and an optical effective region 31B. The optical ineffective region 31A surrounds the optical effective region 31B and includes the peripheral portion 311, which has an annular peripheral surface 312 correspondingly facing the inner wall 132. The optical effective region 31B is concave-convex in shape, wherein the upper surface of the first lens 31 is convex and the lower surface of the first lens 31 is concave. The optical effective region 31B allows the optical axis of the image light to pass through. As shown in FIG. 7, FIG. 9, and FIG. 10, when the first lens 31 is installed in the receiving groove 13, the fixing portions 16 respectively abut against the peripheral portion 311 of the first lens 31, and the inner surface 161 of each of the fixing portions 16 abuts against the annular peripheral surface 312 of the first lens 31. In the current embodiment, the at least one slot s includes three slots s as an example; each of the slots s provided between a portion of the annular peripheral surface 312 of the first lens 31 and the inner wall 132 is formed between two of the fixing portion 16 that are adjacent (shown in FIG. 9); the at least one gap g includes three gaps g as an example; the gaps g provided between the electric heating element 21 and the inner wall 132 are respectively formed between two of the plurality of fixing portions 16 that are adjacent, thereby each of the gaps g correspondingly communicates with one of the slots s. (shown in FIG. 10). In other embodiments, and the number of the slot s and the number of the gap g are not limited to there, but could be one or plural, as long as the number of the slot s corresponds to the number of the gap g. As the annular peripheral surface 312 of the first lens 31 is aligned with the peripheral edge of the electric heating element 21, the width of the slots is approximately equal to the width of the gap g. Thus, the first lens 31 is limited by the fixing portions 16, so that the first lens 31 is positioned in the receiving groove 13.

In addition, in this embodiment, the lens assembly 30 further includes a second lens 32, a third lens 33, and a fourth lens 34. The second lens 32, the third lens 33, and the fourth lens 34 are sequentially arranged along the central axis L in the through groove 14 of the body portion 12, wherein the fourth lens 34 is adjacent to the image-side opening 121 of the lens barrel 10. In other embodiments, the number of the lenses in the lens assembly 30 could be adjusted according to requirements, or the second lens 32, the third lens 33, and the fourth lens 34 could be omitted, as long as at least the first lens 31 is present.

The heat-insulating and positioning module 40 is disposed in the receiving groove 13 of the lens barrel 10. The heat-insulating and positioning module 40 is made of solid material (asbestos, glass fiber), and a thermal conductivity of the heat-insulating and positioning module 40 is less than 0.1 W/m·K. Referring to FIG. 7, FIG. 11, FIG. 13, and FIG. 14, in this embodiment, the heat-insulating and positioning module 40 includes an outer annular fixing seat 41, an inner annular fixing seat 42, and a limiting block 43. The outer annular fixing seat 41 surrounds the peripheral portion 311 of the first lens 31. The outer annular fixing seat 41 has a plurality of retaining blocks 411 and a plurality of notches 412. The retaining blocks 411 are arranged around the inner annular fixing seat 42 at intervals, and the notches 412 are respectively disposed between two adjacent retaining blocks 411 to correspondingly match one of the fixing portions 16. When the heat-insulating and positioning module 40 is installed in the receiving groove 13, the retaining blocks 411 correspondingly engage with the slots s and extend into the gap g, and an end portion of each of the retaining blocks 411 abuts against a side surface of two adjacent fixing portion 16, effectively blocking the peripheral portion 311 of the first lens 31 from contacting the inner wall 132 of the lens barrel 10 in the slots s, as well as reducing the gap g between the electric heating element 21 of the heating module 20 and the inner wall 132 of the lens barrel 10. The inner annular fixing seat 42 is abutted against the optical ineffective region 31A and surrounds the optical effective region 31B. The limiting block 43 radially protrudes from an outer side of the outer annular fixing seat 41. Two side edges of the limiting block 43 each have a card slot 431. The limiting block 43 extends out of the side opening 18 and is inserted into the cutting groove 181, and the two card slots 431 correspondingly engage with a peripheral edge of the side opening 18. The limiting block 43 is further provided with a guide hole (not shown) for the power connection part 22 to pass through the side opening 18, so that the power connection part 22 is guided out of the lens barrel 10.

In this way, when the heating module 20 is activated for heating, the heat-insulating and positioning module 40 effectively prevents the electric heating element 21 from contacting the inner wall 132 of the lens barrel 10 and prevents the peripheral portion 311 of the first lens 31 from contacting the inner wall 132 of the lens barrel 10, so that the effect of the thermal energy of the heating module 20 being dispersed to the lens barrel 10 due to conduction could be effectively reduced and the concentrated heating efficiency of the heating module 20 on the first lens 31 could be improved, thereby uniformly heating the entire first lens 31. Thus, the purpose of removing fog from the first lens 31 could be achieved, thereby enhancing the clarity of the image captured by the lens assembly 30.

However, in other embodiments, the structure of the heat-insulating and positioning module 40 could be adjusted according to requirements, wherein the heat-insulating and positioning module 40 is not limited to including the outer annular fixing seat 41, inner annular fixing seat 42, and limiting block 43, as long as the heat-insulating and positioning module 40 could restrict the peripheral portion 311 of the first lens 31 and correspondingly block the slots s between the peripheral portion 311 and the inner wall 132 of the lens barrel 10. The number of the notches 412 of the outer annular fixing seat 41 corresponds to the number of the fixing portions 16 of the lens barrel 10. Simply put, when the number of the fixing portion 16 of the lens barrel 10 is at least one, the number of the notches 412 of the outer annular fixing seat 41 could also be adjusted to at least one, or the notch 412 of the outer annular fixing seat 41 could be omitted. In addition, the heat-insulating and positioning module 40 could be omitted, as long as a slot s is provided between the peripheral portion 311 of the first lens 31 and the inner wall 132 of the lens barrel 10 and a gap g is formed between the peripheral edge of the heating module 20 and the inner wall 132 of the lens barrel 10, so that the electric heating element 21 and the peripheral portion 311 of the first lens 31 are prevented from contacting the inner wall 132 of the lens barrel 10, which could also achieve the purpose of reducing the effect of the thermal energy of the heating module 20 being dispersed to the lens barrel 10 due to conduction.

Figure 12:
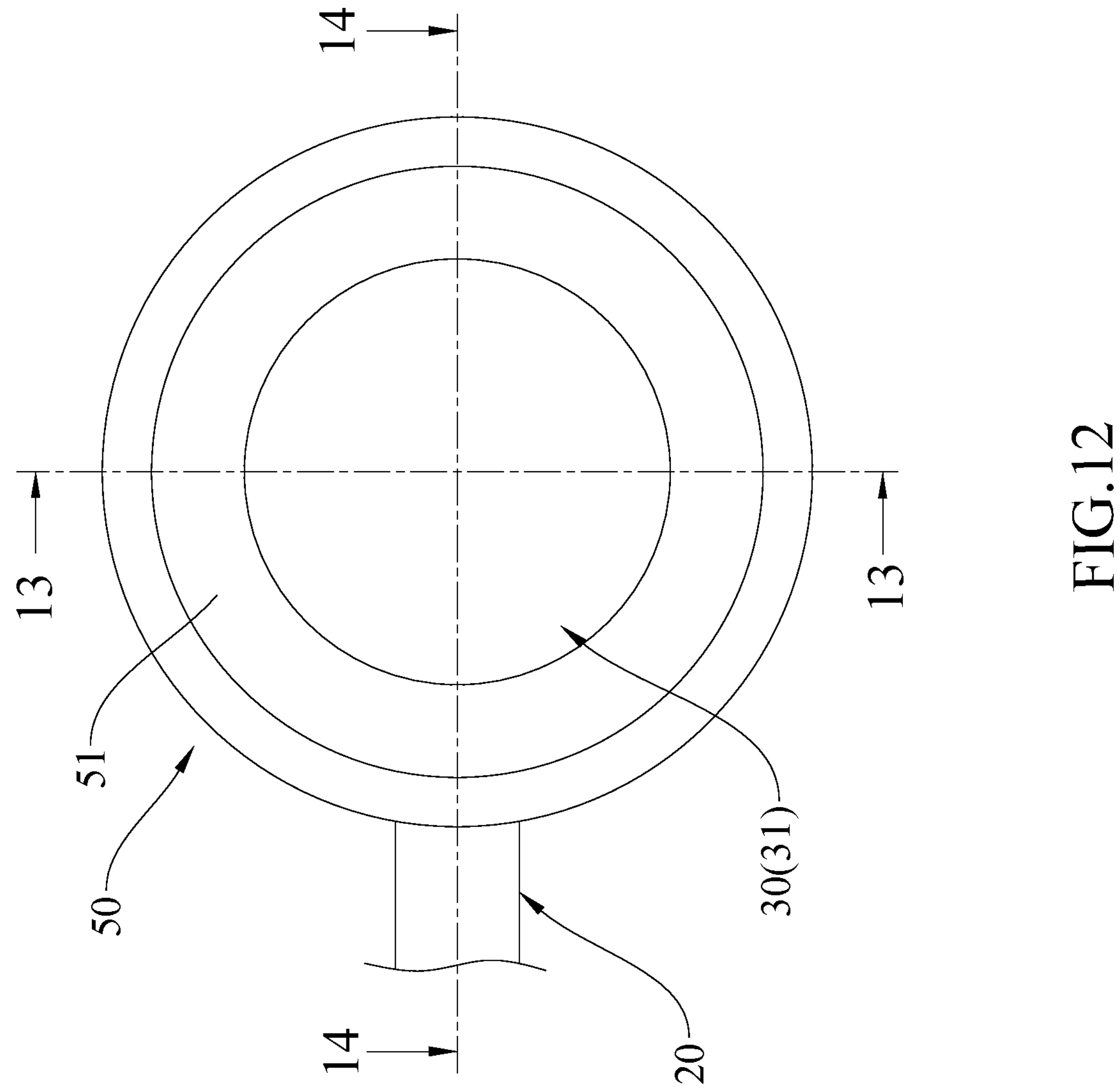
FIG. 12 is a top view of the defogging lens barrel structure according to the embodiment of the present invention.
Figure 13:
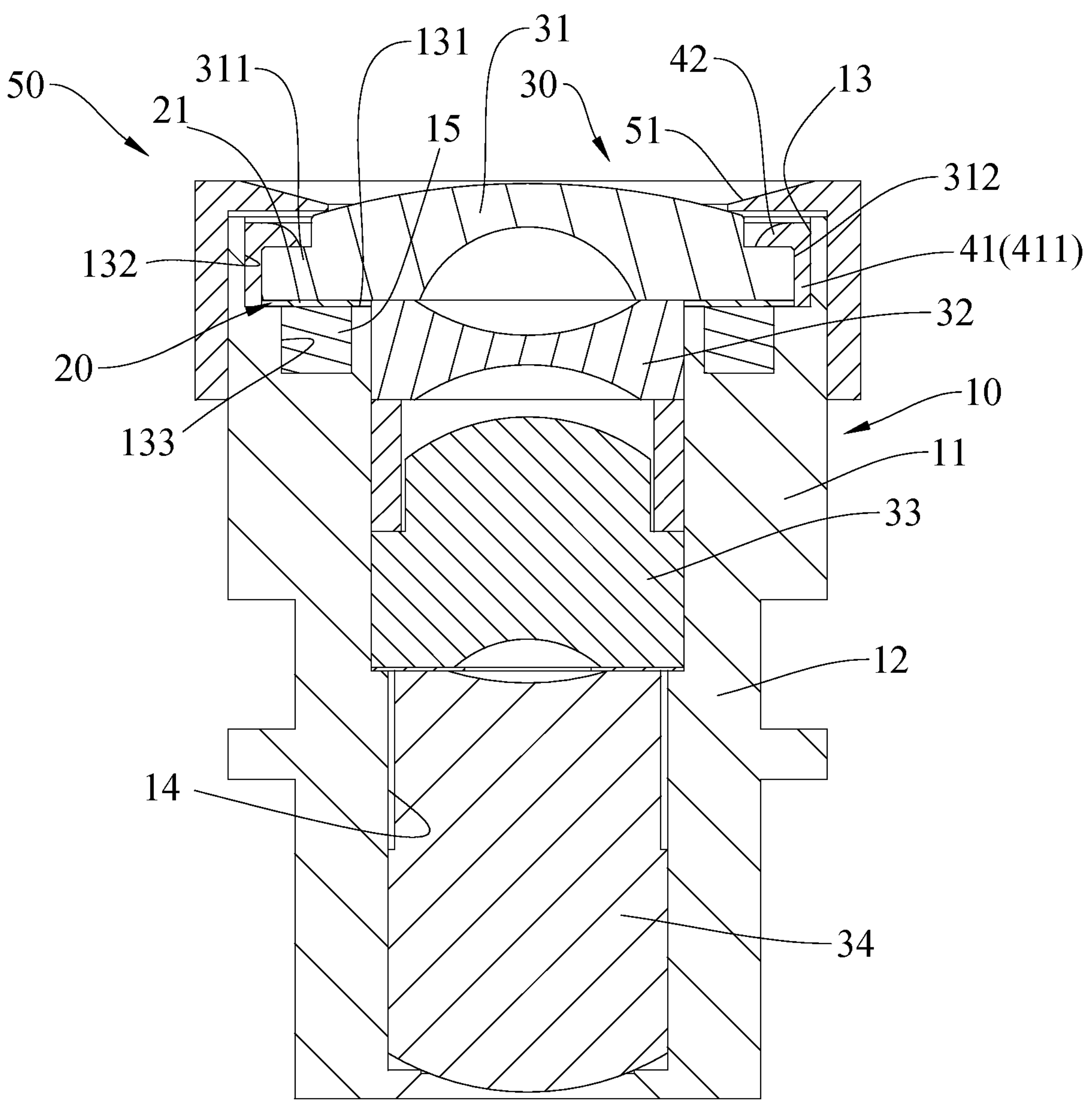
FIG. 13 is a schematic sectional view along the sectional line 13-13 in FIG. 12.
Figure 14:
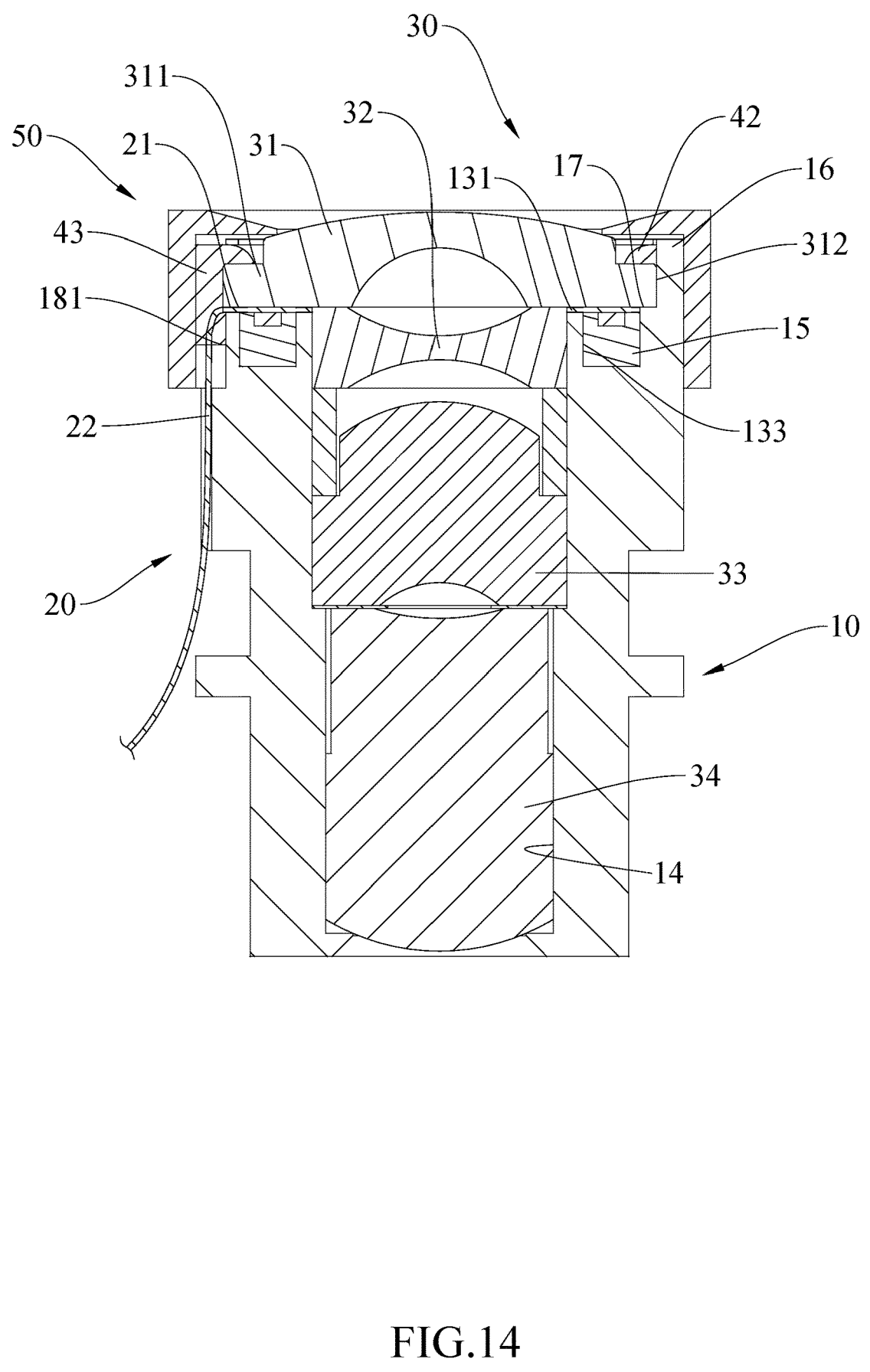

The lens cover 50 is fitted to an outer edge of the head 11 of the lens barrel 10 as shown in FIG. 12 to FIG. 14. One end of the lens cover 50 extends inward to form a blocking ring 51, wherein the blocking ring 51 partially shields the object-side opening 111 of the lens barrel 10. Since the first lens 31 is accommodated in the receiving groove 13, the upper surface of the first lens 31 protrudes out of the object-side opening 111. The blocking ring 51 could abut against the upper surface of the first lens 31, thereby further enhancing the effect of limiting the first lens 31 in the receiving groove 13. However, in other embodiments, the design of the lens cover 50 could be adjusted according to requirements. For example, the lens cover 50 is not limited to having a blocking ring 51, or the lens cover 50 could be omitted.

Thus, the design of the defogging lens barrel structure 100 in this embodiment is that when the first lens 31 is installed in the receiving groove 13 of the lens barrel 10, a slot s is formed between the peripheral portion 311 of the first lens 31 and the inner wall 132 of the lens barrel 10, so that the annular peripheral surface 312 of the first lens 31 does not contact the inner wall 132 of the lens barrel 10. Additionally, the electric heating element 21 of the heating module 20 could be quickly positioned in the receiving groove 13 of the lens barrel 10 by the positioned parts 23 correspondingly matching with the positioning parts 17 of the lens barrel 10, and a gap g is formed between the peripheral edge of the electric heating element 21 and the inner wall 132 of the lens barrel 10. In this way, when the heating module 20 is activated for heating, the contact area between the electric heating element 21 and the inner wall 132 and the contact area between the annular peripheral surface 312 of the first lens 31 and the inner wall 132 are reduced, so that the effect of the thermal energy of the heating module 20 being dispersed to the lens barrel 10 due to conduction could be lowered and the heating module 20 could concentrate more efficiently on heating the first lens 31, thereby uniformly heating the first lens 31 and hence achieving the purpose of removing fog from the first lens 31.

Furthermore, the design of the heat-insulating and positioning module 40 in this embodiment involves correspondingly inserting the retaining blocks 411 of the outer annular fixing seat 41 into the slots s and extending the retaining blocks 411 into the gap g and the end portion of the retaining blocks 411 of the outer annular fixing seat 41 abutting against the side surface of two adjacent fixing portions 16, thereby effectively preventing the contact between the annular peripheral surface 312 of the first lens 31 and the inner wall 132 of the lens barrel 10, as well as the contact between the peripheral edge of the electric heating element 21 and the inner wall 132 of the lens barrel 10. The heat-insulating and positioning module 40 surrounds the peripheral edge of the electric heating element 21 and the first lens 31, thereby further reducing the transfer of thermal energy between the heating module 20 and the lens barrel 10 through heat convection and radiation. In this way, the heating efficiency of the heating module 20 on the first lens 31 could be concentrated and enhanced to reduce fogging of the first lens 31 and hence improve the clarity of the image captured by the lens assembly 30. Thus, the defogging lens barrel structure 100 could be applied in various environments without being limited by the change in climate and temperature difference.

It must be pointed out that the embodiments described above are only some embodiments of the present invention. All equivalent structures which employ the concepts disclosed in this specification and the appended claims should fall within the scope of the present invention.

What is claimed is:

1. A defogging lens barrel structure, comprising:

a lens barrel comprising a receiving groove, wherein an inner portion of the receiving groove has an inner wall; the receiving groove has a side opening radially penetrating the inner wall of the receiving groove;

a heating module disposed inside the receiving groove of the lens barrel and adapted to provide a heat source; and a lens assembly disposed inside the lens barrel and comprising a first lens, wherein the first lens is installed in the receiving groove and supported on the heating module; the first lens has a peripheral portion, wherein at least one slot is provided between the peripheral portion and the inner wall; the peripheral portion has an annular peripheral surface facing the inner wall of the receiving groove;

a heat-insulating and positioning module installed in the receiving groove of the lens barrel, wherein the heat-insulating and positioning module surrounds the peripheral portion of the first lens and is fixed within the at least one slot; a thermal conductivity of the heat-insulating and positioning module is less than 0.1 W/m·K; the heat-insulating and positioning module includes an outer annular fixing seat, wherein the outer annular fixing seat is correspondingly disposed within the at least one slot and contacts the annular peripheral surface and the inner wall, thereby the outer annular fixing seat is positioned between the lens barrel and the first lens; the heat-insulating and positioning module has a limiting block radially protruding outward from the outer annular fixing seat; two card slots are respectively provided on two side edges of the limiting block; when the heat-insulating and positioning module is installed in the receiving groove of the lens barrel, the limiting block extends out of the side opening and the two card slots are correspondingly engaged with a peripheral edge of the side opening.

2. The defogging lens barrel structure as claimed in claim 1, wherein the first lens has an optical ineffective region and an optical effective region; the optical ineffective region surrounds the optical effective region, and the optical ineffective region comprises the peripheral portion and the annular peripheral surface; the heat-insulating and positioning module includes an inner annular fixing seat, wherein the outer annular fixing seat is engaged with an outer periphery of the inner annular fixing seat; the outer annular fixing seat surrounds the peripheral portion of the optical ineffective region, and the inner annular fixing seat abuts against the optical ineffective region and surrounds the optical effective region.

3. The defogging lens barrel structure as claimed in claim 1, wherein the heating module comprises an electric heating element and a power connection part; the electric heating element is supported on a bottom of the receiving groove; the first lens is disposed on the electric heating element; the power connection part is connected to the electric heating element and extends out of the lens barrel through the side opening to be connected to an external power source.

4. The defogging lens barrel structure as claimed in claim 3, wherein the lens barrel comprises a cutting groove and a guiding groove; the cutting groove is cut flat on the bottom of the receiving groove along an axis of the side opening; the guiding groove is disposed on an outer peripheral surface of the lens barrel along the axis of the side opening and opens to communicate with the cutting groove; when the heating module and the heat-insulating and positioning module are installed in the receiving groove, the power connection part of the heating module is guided out of the side opening and extends towards the cutting groove and the guiding groove; a part of the power connection part is correspondingly accommodated within the guiding groove; the limiting block of the heat-insulating and positioning module extends out of the side opening to be engaged with the cutting groove.

5. A defogging lens barrel structure, comprising:

a lens barrel comprising a receiving groove, wherein an inner portion of the receiving groove has an inner wall;

a heating module disposed inside the receiving groove of the lens barrel and adapted to provide a heat source; and a lens assembly disposed inside the lens barrel and comprising a first lens, wherein the first lens is installed in the receiving groove and supported on the heating module; the first lens has a peripheral portion, wherein at least one slot is provided between the peripheral portion and the inner wall; the peripheral portion has an annular peripheral surface facing the inner wall of the receiving groove;

a heat-insulating and positioning module installed in the receiving groove of the lens barrel, wherein the heat-insulating and positioning module surrounds the peripheral portion of the first lens and is fixed within the at least one slot; a thermal conductivity of the heat-insulating and positioning module is less than 0.1

W/m·K; the heat-insulating and positioning module comprises an outer annular fixing seat, wherein the outer annular fixing seat is correspondingly disposed within the at least one slot and contacts the annular peripheral surface and the inner wall, thereby the outer annular fixing seat is positioned between the lens barrel and the first lens; the lens barrel comprises at least one fixing portion disposed on the inner wall of the receiving groove to tightly abut against the annular peripheral surface of the first lens; the outer annular fixing seat of the heat-insulating and positioning module has at least one notch correspondingly matching with the at least one fixing portion.

6. The defogging lens barrel structure as claimed in claim 5, wherein the at least one fixing portion of the lens barrel comprises a plurality of fixing portions; the plurality of fixing portions are spaced along the inner wall of the receiving groove; each of the plurality of fixing portions tightly abuts against the annular peripheral surface of the first lens; the at least one slot comprises a plurality of slots; the plurality of slots provided between a portion of the annular peripheral surface of the first lens and the inner wall are respectively formed between two of the plurality of fixing portions that are adjacent.

7. The defogging lens barrel structure as claimed in claim 6, wherein the outer annular fixing seat has a plurality of retaining blocks; the at least one notch of the outer annular fixing seat comprises a plurality of notches; the plurality of retaining blocks are correspondingly engaged and fixed within the plurality of slots, wherein an end portion of each of the plurality of retaining blocks abuts against side of the two adjacent fixing portions; each of the plurality of notches is located between two of the plurality of retaining blocks that are adjacent and correspondingly matches with one of the plurality of fixing portions.

8. A defogging lens barrel structure, comprising:

a lens barrel comprising a receiving groove, wherein an inner portion of the receiving groove has an inner wall and at least one positioning part; the receiving groove has a side opening radially penetrating the inner wall of the receiving groove;

a heating module disposed inside the receiving groove of the lens barrel and adapted to provide a heat source; the heating module has at least one positioned part corresponding to the at least one positioning part of the lens barrel, and at least one gap is provided between the heating module and the inner wall; and a lens assembly disposed inside the lens barrel and comprising a first lens, wherein the first lens is installed in the receiving groove and supported on the heating module; the first lens has a peripheral portion; the peripheral portion has an annular peripheral surface facing the inner wall of the receiving groove; at least one slot is provided between the peripheral portion and the inner wall;

a heat-insulating and positioning module disposed in the receiving groove of the lens barrel, wherein the heat-insulating and positioning module surrounds the peripheral portion of the first lens and is fixed within the at least one slot; a thermal conductivity of the heat-insulating and positioning module is less than 0.1 W/m·K; the heat-insulating and positioning module includes an outer annular fixing seat, wherein the outer annular fixing seat is correspondingly disposed within the at least one slot and contacts the annular peripheral surface and the inner wall, thereby the outer annular fixing seat is positioned between the lens barrel and the first lens; the heat-insulating and positioning module has a limiting block radially protruding outward from the outer annular fixing seat; two card slots are respectively provided on two side edges of the limiting block; when the heat-insulating and positioning module is installed in the receiving groove of the lens barrel, the limiting block extends out of the side opening and the two card slots are correspondingly engaged with a peripheral edge of the side opening.

9. The defogging lens barrel structure as claimed in claim 8, wherein the at least one positioning part comprises a protrusion disposed on a bottom of the receiving groove; the heating module has an electric heating element supported on the bottom of the receiving groove; the at least one positioned part includes a hole corresponding to the protrusion and disposed on the electric heating element; the at least one gap is formed between the electric heating element and the inner wall of the receiving groove.

10. The defogging lens barrel structure as claimed in claim 9, wherein the lens barrel comprises at least one fixing portion disposed on the inner wall of the receiving groove to tightly abut against the first lens; the protrusion of the at least one positioning part extends radially outward from the at least one fixing portion; the at least one slot correspondingly communicates with the at least one gap.

11. The defogging lens barrel structure as claimed in claim 10, wherein the at least one fixing portion of the lens barrel comprises a plurality of fixing portions; the plurality of fixing portions are spaced along the inner wall of the receiving groove; each of the plurality of fixing portions tightly abuts against the annular peripheral surface of the first lens; the at least one slot comprises a plurality of slots; the plurality of slots provided between a portion of the annular peripheral surface of the first lens and the inner wall are respectively formed between two of the plurality of fixing portions that are adjacent; the at least one positioning part of the receiving groove comprises a plurality of positioning parts; the protrusions of the plurality of positioning parts are respectively engaged with one of the plurality of fixing portions; the at least one positioned part of the heating module comprises a plurality of positioned parts; the holes of the plurality of positioned portions are correspondingly spaced along a peripheral edge of the electric heating element; the at least one gap comprises a plurality of gaps; the plurality of gaps provided between the electric heating element and the inner wall are respectively formed between two of the plurality of fixing portions that are adjacent, thereby each of the plurality of gaps correspondingly communicates with one of the plurality of slots.

12. The defogging lens barrel structure as claimed in claim 11, wherein the outer annular fixing seat has plurality of retaining blocks and a plurality of notches; the plurality of retaining blocks are correspondingly engaged with the plurality of slots and extend into the plurality of gaps; an end portion of each of the plurality of retaining blocks abuts side edges of the two adjacent fixing portion; the plurality of notches are respectively disposed between two of the plurality of retaining blocks that are adjacent correspondingly match with the plurality of fixing portions.

13. The defogging lens barrel structure as claimed in claim 12, wherein the first lens has an optical ineffective region and an optical effective region; the optical ineffective region surrounds the optical effective region; the optical ineffective region includes the peripheral portion and the annular peripheral surface; the heat-insulating and positioning module comprises an inner annular fixing seat; the outer annular fixing seat is engaged with an outer periphery of the inner annular fixing seat; the outer annular fixing seat surrounds the peripheral portion of the optical ineffective region, and the inner annular fixing seat abuts the optical ineffective region and surrounds the optical effective region.

14. The defogging lens barrel structure as claimed in claim 10, wherein the outer annular fixing seat extends into the at least one gap between the electric heating element and the inner wall; the outer annular fixing seat has at least one notch correspondingly matching with the at least one fixing portion.

15. The defogging lens barrel structure as claimed in claim 14, wherein the first lens has an optical ineffective region and an optical effective region; the optical ineffective region surrounds the optical effective region; the optical ineffective region includes the peripheral portion and the annular peripheral surface; the heat-insulating and positioning module comprises an inner annular fixing seat; the outer annular fixing seat is engaged with an outer periphery of the inner annular fixing seat; the outer annular fixing seat surrounds the peripheral portion of the optical ineffective region, and the inner annular fixing seat abuts the optical ineffective region and surrounds the optical effective region.

16. The defogging lens barrel structure as claimed in claim 9, wherein the heating module comprises a power connection part, wherein the power connection part is connected to the electric heating element and is guided out of the side opening of the lens barrel to be connected to an external power source.

17. The defogging lens barrel structure as claimed in claim 16, wherein the lens barrel has a cutting groove and a guiding groove; the cutting groove is cut flat along an axis of the side opening at the bottom of the receiving groove; the guiding groove is disposed on an outer peripheral surface of the lens barrel along the axis of the side opening and opens to communicate with the cutting groove; when the heating module is installed in the receiving groove, the power connection part of the heating module is guided out of the side opening and extends in a direction toward the cutting groove and the guiding groove and a part of the power connection part is correspondingly accommodated within the guiding groove.

* * * * *